United States Patent
Watanabe et al.

(10) Patent No.: US 11,374,815 B2
(45) Date of Patent: Jun. 28, 2022

(54) NETWORK CONFIGURATION DIAGRAM GENERATE METHOD AND RECORDING MEDIUM

(71) Applicant: FUJITSU LIMITED, Kawasaki (JP)

(72) Inventors: Yukihiro Watanabe, Kawasaki (JP); Reiko Kondo, Yamato (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/178,701

(22) Filed: Feb. 18, 2021

(65) Prior Publication Data
US 2021/0306216 A1 Sep. 30, 2021

(30) Foreign Application Priority Data

Mar. 25, 2020 (JP) .............................. JP2020-055171

(51) Int. Cl.
*H04L 12/24* (2006.01)
*H04L 15/16* (2006.01)
(Continued)

(52) U.S. Cl.
CPC ...... *H04L 41/0823* (2013.01); *G06F 9/45558* (2013.01); *H04L 41/12* (2013.01);
(Continued)

(58) Field of Classification Search
CPC . H04L 41/0823; H04L 41/12; H04L 41/0816; H04L 41/145; H04L 41/0826;
(Continued)

(56) References Cited

U.S. PATENT DOCUMENTS 9,183,062 B2 * 11/2015 Balani ................. G06F 9/45558
9,537,745 B1 * 1/2017 Halcrow ............... G06F 3/0659
(Continued)

FOREIGN PATENT DOCUMENTS

CN 105704180 A * 6/2016 ......... H04L 41/0893
CN 110399203 A * 11/2019
(Continued)

OTHER PUBLICATIONS

Zhang, Qiannan et al., "An Intelligent Anomaly Detection and Reasoning Scheme for VM Live Migration via Cloud Data Mining", 2013 IEEE 25th International Conference on Tools With Artificial Intelligence, IEEE, Nov. 4, 2013, pp. 412-419, XP032564736.
(Continued)

*Primary Examiner* — David R Lazaro
*Assistant Examiner* — Berhanu Shitayewoldetadik
(74) *Attorney, Agent, or Firm* — Fujitsu Patent Center

(57) ABSTRACT

A network configuration diagram generate method executed by a computer, the method includes identifying, in a predetermined system in which a plurality of virtual machines are used, a location where each of the plurality of virtual machines is located and a communication destination with which each of the plurality of virtual machines communicates; determining, for each change in a configuration of the predetermined system, a relationship of a communication distance between the plurality of virtual machines by using the location and the communication destination, the configuration indicating a relationship of the plurality of virtual machines; extracting a difference between the relationship of the communication distance before the configuration change and the relationship of the communication distance after the configuration change; and generating a network configuration diagram in which the extracted difference is indicated.

6 Claims, 17 Drawing Sheets

(51) Int. Cl.
*G06F 9/455* (2018.01)
*G06F 15/16* (2006.01)
*G06F 16/21* (2019.01)
*G06F 16/22* (2019.01)
*H04L 29/06* (2006.01)
*H04L 41/0823* (2022.01)
*H04L 41/12* (2022.01)

(52) U.S. Cl.
CPC ............... *G06F 2009/4557* (2013.01); *G06F 2009/45595* (2013.01)

(58) Field of Classification Search
CPC . H04L 41/085; H04L 43/045; G06F 9/45558; G06F 2009/4557; G06F 2009/45595; G06F 11/0754; G06F 11/3006; G06F 11/301; G06F 11/323; G06F 11/3419
USPC ........................................................ 709/223
See application file for complete search history.

(56) References Cited

U.S. PATENT DOCUMENTS

| | | | | |
|---|---|---|---|---|
| 11,132,373 | B1* | 9/2021 | Timko | G06F 11/3495 |
| 2011/0225277 | A1* | 9/2011 | Freimuth | G06F 9/45558 718/1 |
| 2012/0331468 | A1* | 12/2012 | Bozek | H04L 41/0806 718/1 |
| 2013/0290953 | A1* | 10/2013 | Li | G06F 9/5066 718/1 |
| 2014/0196041 | A1* | 7/2014 | Takamura | G06F 9/5088 718/1 |
| 2014/0245292 | A1* | 8/2014 | Balani | G06F 9/5077 718/1 |
| 2014/0278808 | A1* | 9/2014 | Iyoob | G06Q 30/0206 705/7.35 |
| 2015/0052516 | A1 | 2/2015 | French et al. | |
| 2015/0172148 | A1 | 6/2015 | Ishida et al. | |
| 2015/0235308 | A1* | 8/2015 | Mick | H04L 43/0817 705/26.3 |
| 2016/0103695 | A1* | 4/2016 | Udupi | H04L 47/78 718/1 |
| 2016/0147548 | A1* | 5/2016 | Itsumi | G06F 9/5083 718/1 |
| 2016/0241438 | A1* | 8/2016 | Sundaram | H04L 41/0806 |
| 2016/0364258 | A1* | 12/2016 | Katihar | G06F 8/60 |
| 2017/0097855 | A1* | 4/2017 | Hart | G06F 9/4856 |
| 2017/0237484 | A1* | 8/2017 | Heath | H04B 1/1027 398/26 |
| 2017/0255484 | A1* | 9/2017 | Nakashima | H04L 67/101 |

FOREIGN PATENT DOCUMENTS

| | | | | |
|---|---|---|---|---|
| CN | 108632813 | B * | 5/2021 | ........ H04W 36/0011 |
| CN | 108804210 | B * | 5/2021 | ......... G06F 9/45558 |
| CN | 107967179 | B * | 8/2021 | ......... G06F 9/45558 |
| CN | 109165081 | B * | 9/2021 | ......... G06F 9/45558 |
| CN | 113615137 | A * | 11/2021 | ......... H04L 67/2814 |
| DE | 112019005604 | T5 * | 9/2021 | ............ G06F 11/302 |
| JP | 2010034915 | A * | 2/2010 | |
| JP | 2015-115018 | A | 6/2015 | |
| JP | 2017157153 | A * | 9/2017 | ......... G06F 9/45558 |
| JP | 2018-160020 | A | 10/2018 | |
| WO | 2017/056238 | A1 | 4/2017 | |

OTHER PUBLICATIONS

Anonymous, "Hop (networking)", Wikipedia, Jan. 16, 2020, pp. 1-3, XP055824304, Retrieved from the Internet: URL:https://en.wikipedia.org/w/index.php?title=Hop_(networking)&oldid=936137329 [retrieved on Jul. 14, 2021].

Anonymous, "Graph drawing", Wikipedia, Feb. 28, 2020, pp. 1-9, XP055824297, Retrieved from the Internet: URL:https://en.wikipedia.org/w/index.php?title=Graph_drawing&oldid=943086535 [retrieved on Jul. 14, 2021.

Anonymous, "Matrix (mathematics)", Wikipedia, Mar. 8, 2020, pp. 1-23, XP055824318, Retrieved from the Internet:URL:https://en.wikipedia.org/w/index.php?title=Matrix_(mathematics)&oldid=944580966 [retrieved on Jul. 14, 2021].

Extended European Search Report dated Jul. 26, 2021 for corresponding European Patent Application No. 21154729.4, 9 pages.

* cited by examiner

FIG. 4

|  | VM1 | VM2 | VM3 | VM4 | VM5 |
|---|---|---|---|---|---|
| VM1 | | | | | |
| VM2 | 0 | | | | |
| VM3 | 1 | - | | | |
| VM4 | - | 10 | 10 | | |
| VM5 | - | 100 | - | - | |

(SYMMETRIC MATRIX)

FIG. 8

```
2019-12-02 18:33:21 {src:VM1, dst:VM2}
2019-12-02 18:33:22 {src:VM1, dst:VM3}
2019-12-02 18:33:22 {src:VM1, dst:VM2}
2019-12-02 18:33:23 {src:VM2, dst:VM4}
2019-12-02 18:33:23 {src:VM3, dst:VM4}
2019-12-02 18:33:22 {src:VM2, dst:VM5}
2019-12-02 18:35:33 {src:VM1, dst:VM3}
2019-12-02 18:35:33 {src:VM3, dst:VM4}
            ⋮
            ⋮
```

FIG. 9

| VM | BUSINESS OFFICE | RACK | SERVER |
|---|---|---|---|
| VM1 | BUSINESS OFFICE A | RACK 1 | SERVER 1 |
| VM2 | BUSINESS OFFICE A | RACK 1 | SERVER 1 |
| VM3 | BUSINESS OFFICE A | RACK 1 | SERVER 2 |
| VM4 | BUSINESS OFFICE A | RACK 2 | SERVER 3 |
| VM5 | BUSINESS OFFICE B | RACK 3 | SERVER 4 |

FIG. 10

| | COMMUNICATION COST |
|---|---|
| WITHIN SAME SERVER | 0 |
| WITHIN SAME RACK | 1 |
| WITHIN SAME BUSINESS OFFICE | 10 |
| DIFFERENT BUSINESS OFFICES | 100 |

FIG. 16

|  | VM1 | VM2 | VM3 | VM4 | VM5 |
|---|---|---|---|---|---|
| VM1 | | | | | |
| VM2 | 0 | | | | |
| VM3 | 0 | - | | | |
| VM4 | - | 0 | 0 | | |
| VM5 | - | 0 | - | - | |

(SYMMETRIC MATRIX)

FIG. 17

|      | VM1 | VM2 | VM3 | VM4 | VM5 |
|------|-----|-----|-----|-----|-----|
| VM1  |     |     |     |     |     |
| VM2  | WITHIN SAME SERVER | | | | |
| VM3  | WITHIN SAME RACK | - | | | |
| VM4  | - | WITHIN SAME BUSINESS OFFICE | WITHIN SAME BUSINESS OFFICE | | |
| VM5  | - | DIFFERENT BUSINESS OFFICES | - | - | |

(SYMMETRIC MATRIX)

FIG. 18

|  | VM1 | VM2 | VM3 | VM4 | VM5 |
|---|---|---|---|---|---|
| VM1 | | | | | |
| VM2 | +10 | | | | |
| VM3 | 0 | - | | | |
| VM4 | - | -10 | 0 | | |
| VM5 | - | 0 | - | - | |

(SYMMETRIC MATRIX)

NETWORK CONFIGURATION DIAGRAM GENERATE METHOD AND RECORDING MEDIUM

CROSS-REFERENCE TO RELATED APPLICATION

This application is based upon and claims the benefit of priority of the prior Japanese Patent Application No. 2020-55171, filed on Mar. 25, 2020, the entire contents of which are incorporated herein by reference.

FIELD

The embodiments discussed herein are related to a network configuration diagram generate method and a recording medium.

BACKGROUND

There is a technique for managing a virtual machine in a network.

For example, there is a technique related to a virtualization infrastructure monitoring system that detects an abnormality of a virtualization infrastructure and a component that is a primary cause of the abnormality at an early stage. In this technique, a value based on resource information is used to generate a graph with each component as a node and a correlation between components as an edge at regular time intervals. The graph of a current time is compared with a stored graph of a past, a time-series variation of a graph structure is verified by clustering, and it is determined that a failure has occurred in the virtualization infrastructure when the time-series variation of the graph structure is different from that in a normal state.

There is a technique related to an arrangement management system that is suitable for performing an optimum arrangement conforming to specifications of a network when creating a virtual machine. In this technique, a requested virtual machine system is allocated to a physical machine, based on an association table and graph information on a predetermined communication relationship.

In a business system virtually constructed across a plurality of cloud environments, there is a technique related to a managing server that may present a configuration of an entire system, a change in the configuration, and monitoring information in association with each other. In this technique, when a change in a coupling relationship between components is detected, the coupling relationship between the components after the change and a change time are recorded in association with each other, monitoring information and a monitoring time are collected from a data center, and the monitoring information and the monitoring time are recorded in association with each other. As the related art, Japanese Laid-open Patent Publication No. 2018-160020, International Publication Pamphlet No. WO 2017/056238, Japanese Laid-open Patent Publication No. 2015-115018, and the like are disclosed.

SUMMARY

According to an aspect of the embodiments, a network configuration diagram generate method executed by a computer, the method includes identifying, in a predetermined system in which a plurality of virtual machines are used, a location where each of the plurality of virtual machines is located and a communication destination with which each of the plurality of virtual machines communicates; determining, for each change in a configuration of the predetermined system, a relationship of a communication distance between the plurality of virtual machines by using the location and the communication destination, the configuration indicating a relationship of the plurality of virtual machines; extracting a difference between the relationship of the communication distance before the configuration change and the relationship of the communication distance after the configuration change; and generating a network configuration diagram in which the extracted difference is indicated.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of a communication cost model;

FIG. 8 is a diagram illustrating an example of a communication relationship between virtual machines;

FIG. 9 is a diagram illustrating an example of arrangement locations of virtual machines;

FIG. 10 is a diagram illustrating an example of communication cost definition information;

FIG. 16 is a diagram illustrating an example of a communication cost matrix;

FIG. 17 is a diagram illustrating an example of created communication distances;

FIG. 18 is a diagram illustrating an example of a communication cost model reflecting calculation results of differences between communication costs.

DESCRIPTION OF EMBODIMENTS

In the related art, an abnormality of a virtualization infrastructure, for example, an abnormality of a network configuration is detected by detecting an abnormality of a graph based on an abnormal value of clustering in a time-series variation of a graph structure. However, even when an abnormality may be detected, it is difficult to easily specify a degree and a factor of a variation, such as how much the variation is considered to be an abnormal and what kind of variation factor causes an abnormality. When an abnormality occurs in a network, it is desirable that a person who manages the network specify the degree and the factor of the variation of the network configuration thereby promptly dealing with the abnormality.

In view of the above, it is desirable to easily specify an influence of a configuration change of a network.

Hereinafter, an example of an embodiment according to the disclosed technique will be described in detail with reference to the drawings.

First, a background that is a premise of the embodiment described below and an overview of the embodiment will be described.

Figure 1:
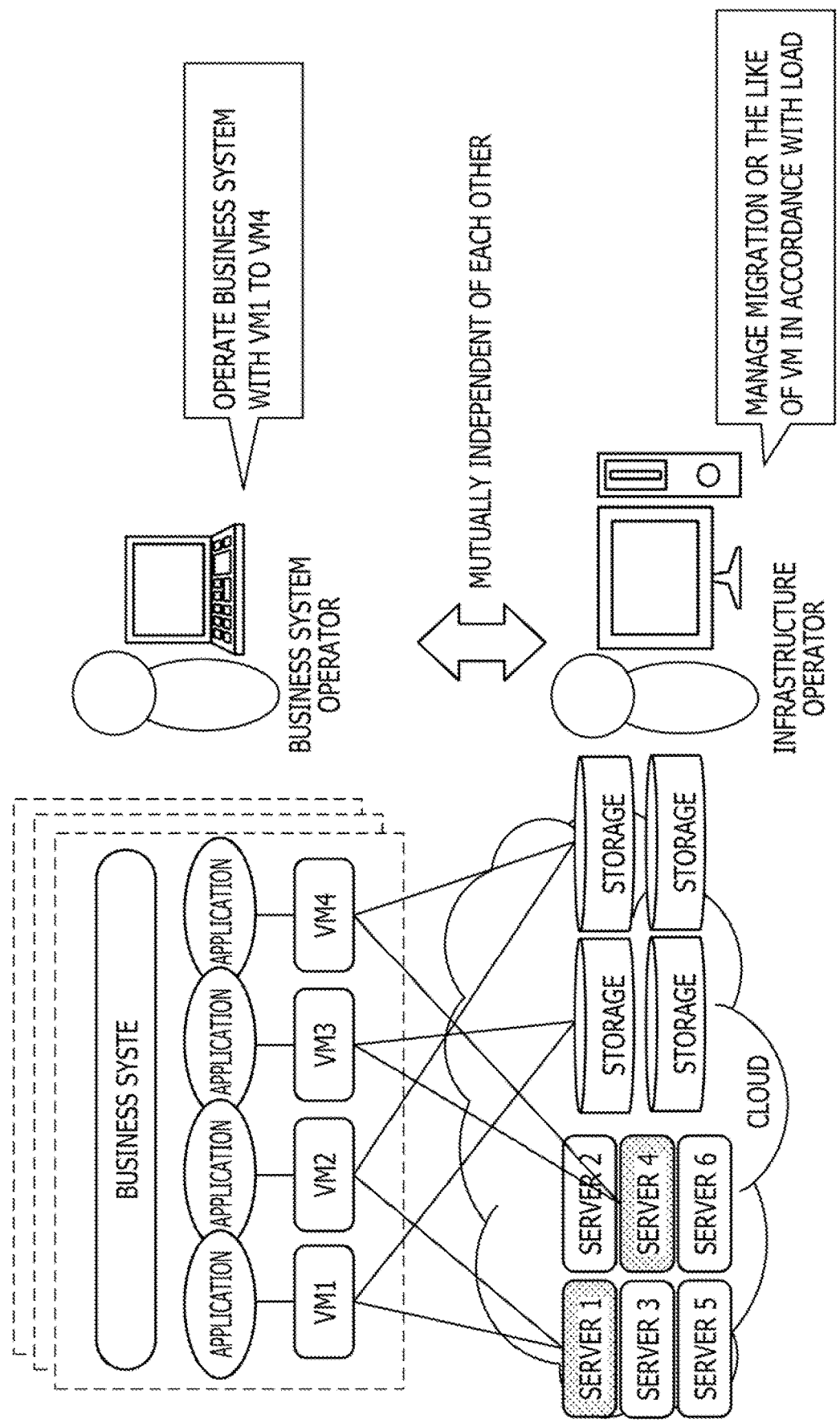
FIG. 1 is a diagram illustrating an example of a relationship between a cloud environment and a business system.

FIG. 1 is a diagram illustrating an example of a relationship between a cloud environment and a business system. As illustrated in FIG. 1, a virtual server and a virtual storage (hereinafter, simply referred to as a server and a storage) over a cloud environment are constructed as an infrastructure (hereinafter, referred to as an infrastructure) of a virtualization environment. A business system is operated by arranging a virtual machine (hereinafter, also referred to as a virtual machine (VM)) in a server over a cloud environment and appropriately using a storage. The business system and the infrastructure of the cloud environment are managed independently of each other by different entities. For example, the business system is managed by a business system operator, and the infrastructure of the cloud environment is managed by an infrastructure operator. With a progress of a virtualization technique, a business system operator is able to operate without being conscious of a network configuration on the infrastructure side, for example, which server over the cloud environment a virtual machine and an application for performing a business are located on. On the other hand, the infrastructure operator is desired to monitor a load of the infrastructure and operate the infrastructure so as not to affect the business system operator. For example, when a total amount of processing of a plurality of virtual machines arranged over a server is about to exceed an amount of processing of the server, the infrastructure operator performs work to suppress performance degradation, such as migrating a virtual machine to another server, for example.

A problem associated with the work for the infrastructure operation occurs. For example, when an infrastructure operator changes a network configuration by migrating a virtual machine to another server, a business system may be affected. No matter which server the virtual machine is migrated to, the same function may be used in the virtual machine. However, when one of two virtual machines over the same server migrates to another server, a communication time may be longer than before the migration depending on a migration destination server. In some business systems, when such a delay in communication time occurs, the delay may be treated as a system performance abnormality. For example, in a business system in which a response in a short time is requested, since a communication delay largely affects a business, there is a case where the communication delay due to the change in the network configuration as described above is determined as a system failure.

Figure 2:
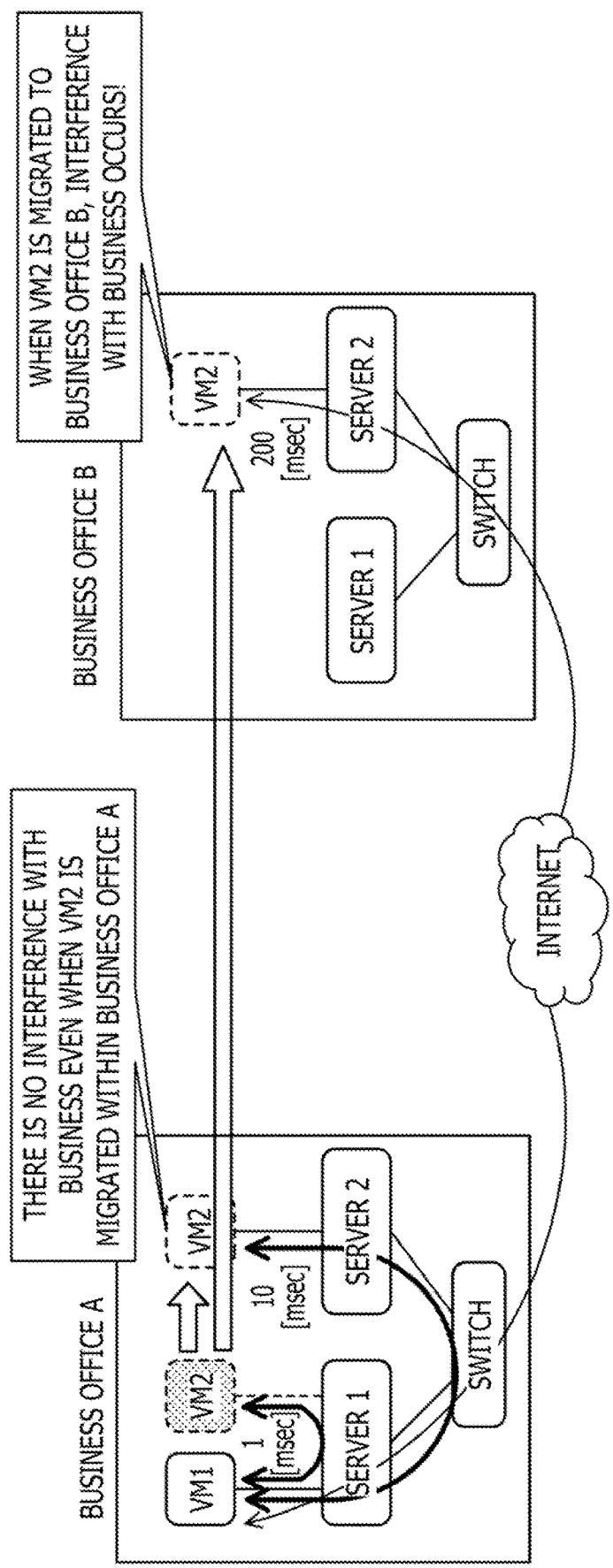
FIG. 2 is a diagram illustrating an example of a case where a communication delay due to a change of a network configuration is determined as a system failure.

FIG. 2 is a diagram illustrating an example of a case where a communication delay due to a change of a network configuration is determined as a system failure. As illustrated in FIG. 2, it is assumed that there are a business office A and a business office B, and each business office has a server. In a case where a VM1 and a VM2 are arranged on a server 1 of a business office A to operate the business system, it is assumed that a communication time when communicating a certain amount of data between the VM1 and the VM2 (hereinafter, also simply referred to as a communication time) is 1 msec. It is assumed that the infrastructure operator migrates the VM2 because the load of the server 1 of the business office A has increased. It is assumed that the communication time regarded as a failure that causes an interference with a business is equal to or more than 100 msec. When the VM2 is migrated to a server 2 of the business office A, a communication speed between the VM1 and the VM2 is 10 msec, which is a communication time that does not cause an interference with a business. Thus, no failure occurs due to the server migration. On the other hand, when the VM2 is migrated to the server 2 of the business office B, the communication time between the VM1 and the VM2 is 200 msec, and an interference with the business occurs. As described above, for example, when a VM is migrated to a different business office, the communication time is delayed because there is an effect that the number of communication devices such as switches intervening between the virtual machines increases. As described above, a migration of the virtual machine due to the configuration change may cause a failure in the business server due to the delay in the communication time, thereby causing an interference with the business.

However, in the case of a business system of which usage is determined in advance, a rule is determined in accordance with performance requirements, and the business system is operated according to the rule. The rule is, for example, a rule related to an arrangement of the virtual machines, such as "two virtual machines that run an application are arranged over the same server". Such a rule related to the virtualization environment is called an affinity rule or a non-affinity rule, and determines a condition for an environment or the like in which the virtual machine is arranged. However, in recent years, there are many business systems of which usage changes frequently after operation, such as microservices that configures a business by combining desirable Web services, and in some cases, it is difficult to determine a rule in advance.

For example, as an example of a business system, it is assumed that there is an operational Web service that treats the communication time of equal to or more than 100 msec as a delay at the beginning of the service. In this Web service, it is assumed that, in the operation at the beginning of the service, a communication time is about 20 msec even when a delay occurs in the communication time. While the business system operator continues the service, the business system operator may make a determination for the service operation, for example, "communication time is about 20 msec at the latest". In such a determination, for example, a case is assumed that, while operating and developing additional Web services, it is determined that there is no problem even when the delay time is assumed to be within 30 msec, and a delay time of msec or more is treated as a delay with a certain additional function or the like as a trigger. In this case, when the infrastructure operator migrates the server on which the virtual machine is arranged and the communication time becomes 30 msec or longer, the business system operator determines that a failure due to a delay has occurred. As described above, when it is attempted to determine a rule that deals with even minute changes in the operation contents on the business system side, not only the rule becomes complicated, but also various problems such as operational restrictions caused by the rule are assumed, and therefore it is practically difficult to operate. For this reason, it is desired that, when a failure occurs after a configuration change, it is possible to easily specify whether or not the failure is caused by the influence of the configuration change, instead of providing a rule to deal with the failure.

Therefore, in the embodiment of the disclosed technology, a communication cost model indicating a communication distance relationship is created for each configuration change, and differences before and after the configuration change are visualized. This visualization is performed by representing the network configuration of the business system by a graph in which virtual machines are represented as nodes and communication relationships between the virtual machines are represented as edges, and generating a difference graph in which the edges are represented in association with differences before and after the configuration change. Generating a difference graph is an example of "visualizing a difference in association with a visual representation related to a configuration change" in the disclosed technique.

Figure 3:
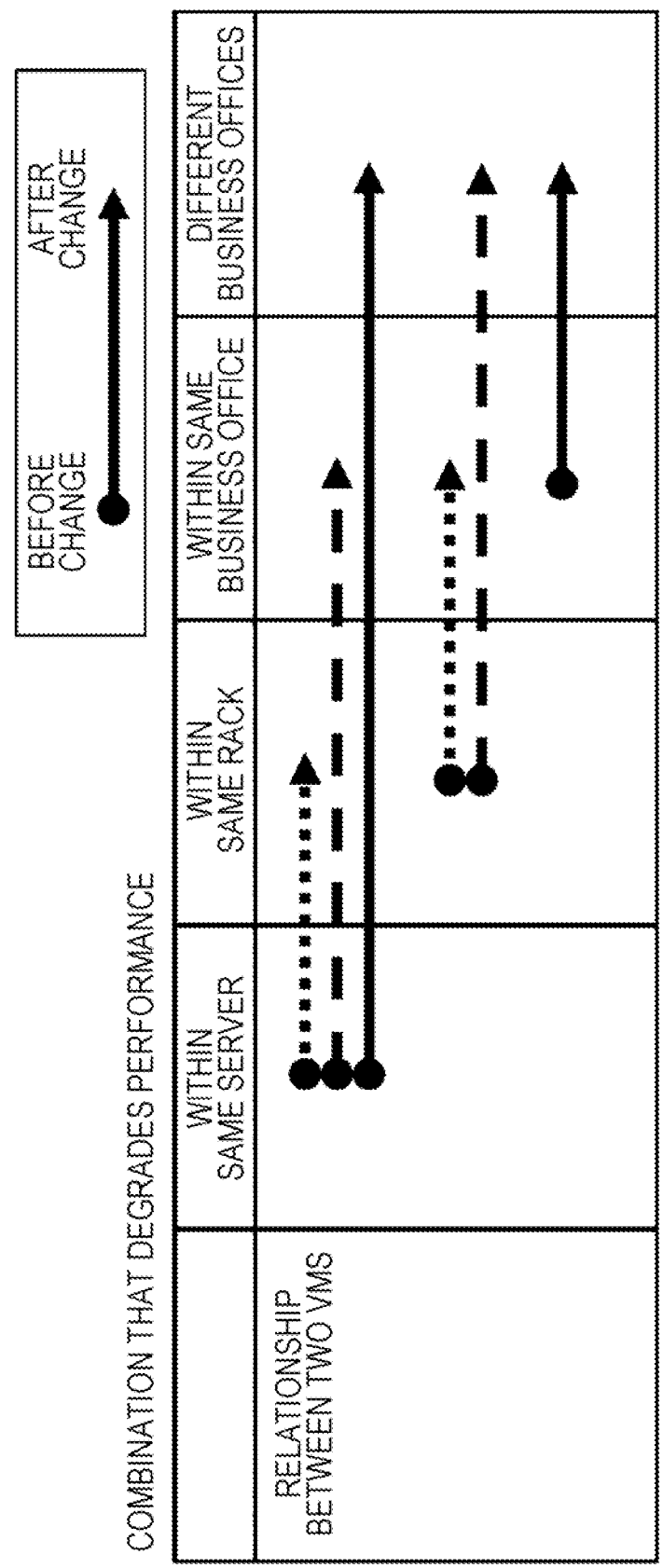
FIG. 3 is a diagram illustrating an example of a configuration change that degrades performance.

An overview of the technique according to the present embodiment will be described. When it is possible to specify a location where a communication time is increased from the configuration information before and after the configuration change, it is possible to narrow down candidates for a location causing the performance failure. Therefore, the communication distance relationship that affects the communication time is determined in advance by combining the configuration information before and after the change that degrades the performance of the two virtual machines. FIG. 3 is a diagram illustrating an example of a configuration change that degrades performance. In the example of FIG. 3, it is assumed that there are positional relationships between the servers where two virtual machines (VMs) are arranged, for example, in the same server, in different servers in the same rack (hereinafter, described as in the same rack), in different racks in the same business office (hereinafter, described as in the same business office), and between different business offices. In this case, in FIG. 3, combinations of the positional relationships before and after a change that cause a configuration change that degrades performance by migrating one of the two virtual machines are indicated by arrows. A starting point of the arrow indicates a positional relationship between the two virtual machines before the configuration change, an end point of the arrow indicates a positional relationship between the two virtual machines after the configuration change, and the arrows indicate that the performance of the virtual machine deteriorates in the order of a dotted line, a broken line, and a solid line. In order to specify a location where the communication time has been extended, it is sufficient to know that the two communicating virtual machines have been migrated to servers in different locations due to the configuration change. Since there are a large number of virtual machines, the configuration change may shorten the communication time between the virtual machines or may extend the communication time between the virtual machines.

Figure 5:
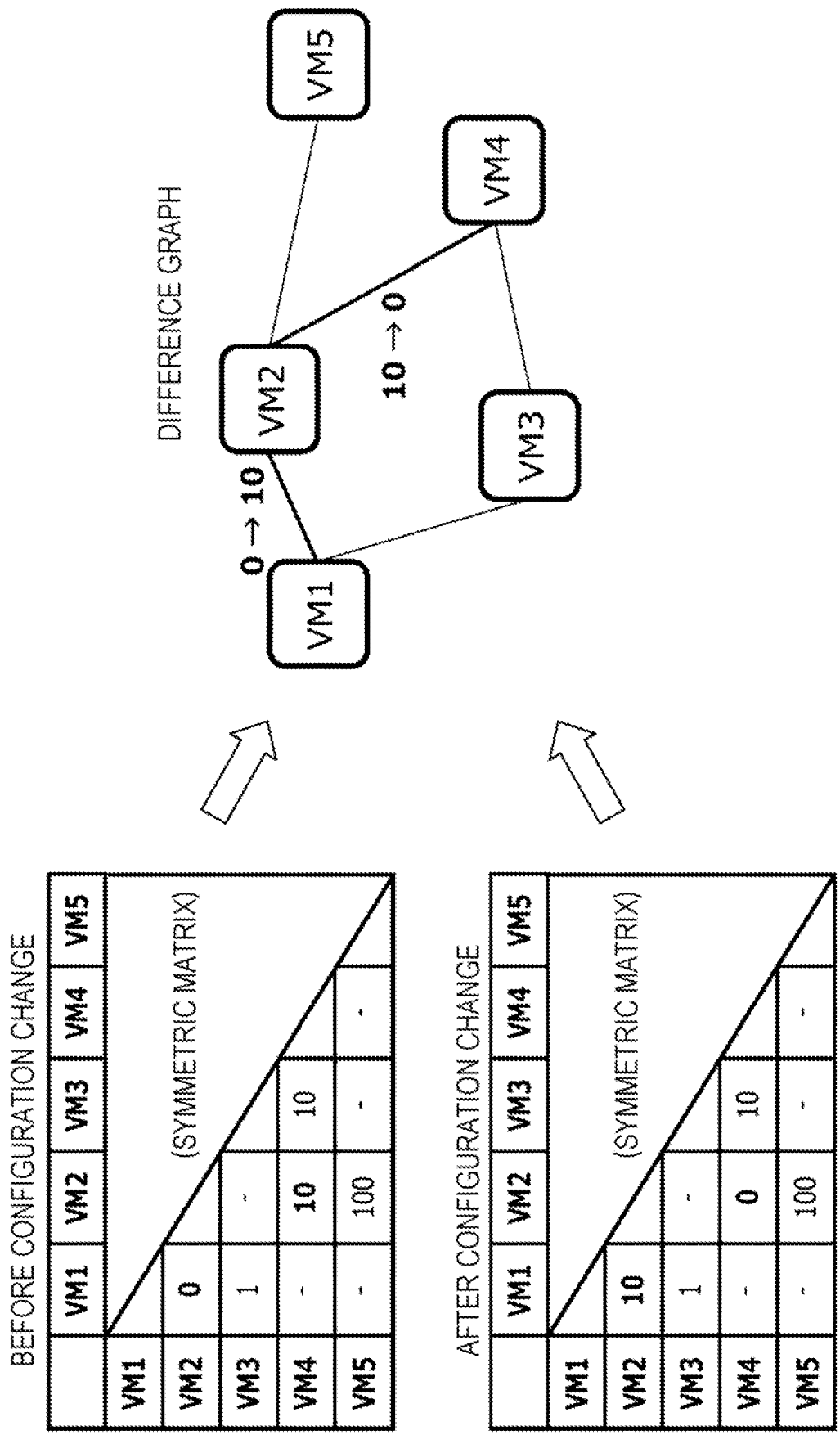
FIG. 5 is a diagram illustrating an example of a communication cost model used in a method according to an embodiment of the present disclosure.

Accordingly, a communication cost model that represents the communication between the virtual machines in the business system by communication costs based on the positional relationship between the servers where the virtual machines are arranged is created. FIG. 4 is a diagram illustrating an example of a communication cost model used in the method according to the embodiment of the present disclosure. As illustrated in FIG. 4, the communication cost model is a table in which the communication costs between the virtual machines are represented by a symmetric matrix. When the arrangement location where the virtual machines are arranged is changed due to the configuration change, the changed communication cost model is recreated. By using the difference between the communication cost models before and after the configuration change, a difference graph is generated that specifies a portion in the business system, where the performance is affected by the configuration change, and the degree of the influence. FIG. 5 is an image diagram when the difference graph is generated from the communication cost models before and after the configuration change. As illustrated in FIG. 5, the difference graph includes nodes indicating the virtual machines included in the business system before and after the configuration change, and edges coupling the nodes corresponding to portions between the virtual machines in communication. In the difference graph, on the edge corresponding to a portion between the virtual machines where the communication cost varies before and after the configuration change, the communication cost before the configuration change and the communication cost after the configuration change are described together. In the example of FIG. 5, "0→10" is described together on the edge between the VM1 and the VM2, which indicates that the communication cost is increased due to the configuration change. On the edge between the VM2 and the VM4, "10→0" is described together, which indicates that the communication cost is decreased. A notation indicating the transition of the communication cost before and after the configuration change, such as "0→10", is merely an example, and may be a notation indicating addition or subtraction of the communication cost before and after the configuration change, such as "+10" and "−10".

By generating such a difference graph so that the infrastructure operator may check the difference graph, it is possible to easily specify a portion that causes performance degradation without presupposed knowledge about a performance problem of a business system occurring after a configuration change. The degree of performance degradation due to a configuration change may be easily grasped.

Figure 6:
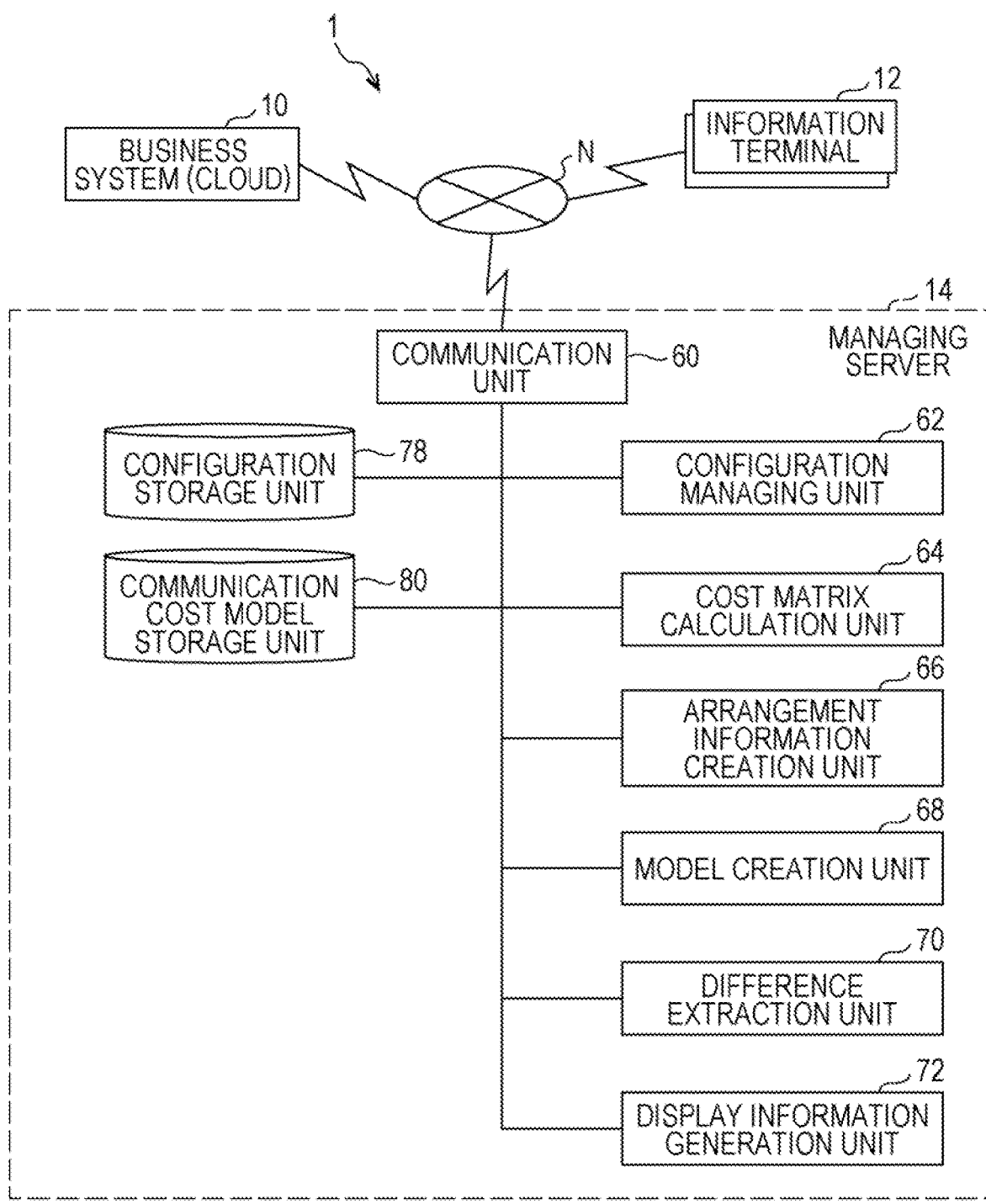
FIG. 6 is a block diagram illustrating a configuration of a configuration management system according to an embodiment of a disclosed technique.

Based on the above background and the outline of the present embodiment, the configuration of the present embodiment will be described below. As illustrated in FIG. 6, in a configuration management system 1 according to the present embodiment, a business system 10, an information terminal 12, and a managing server 14 are coupled to each other via a network N such as the Internet.

Figure 7:
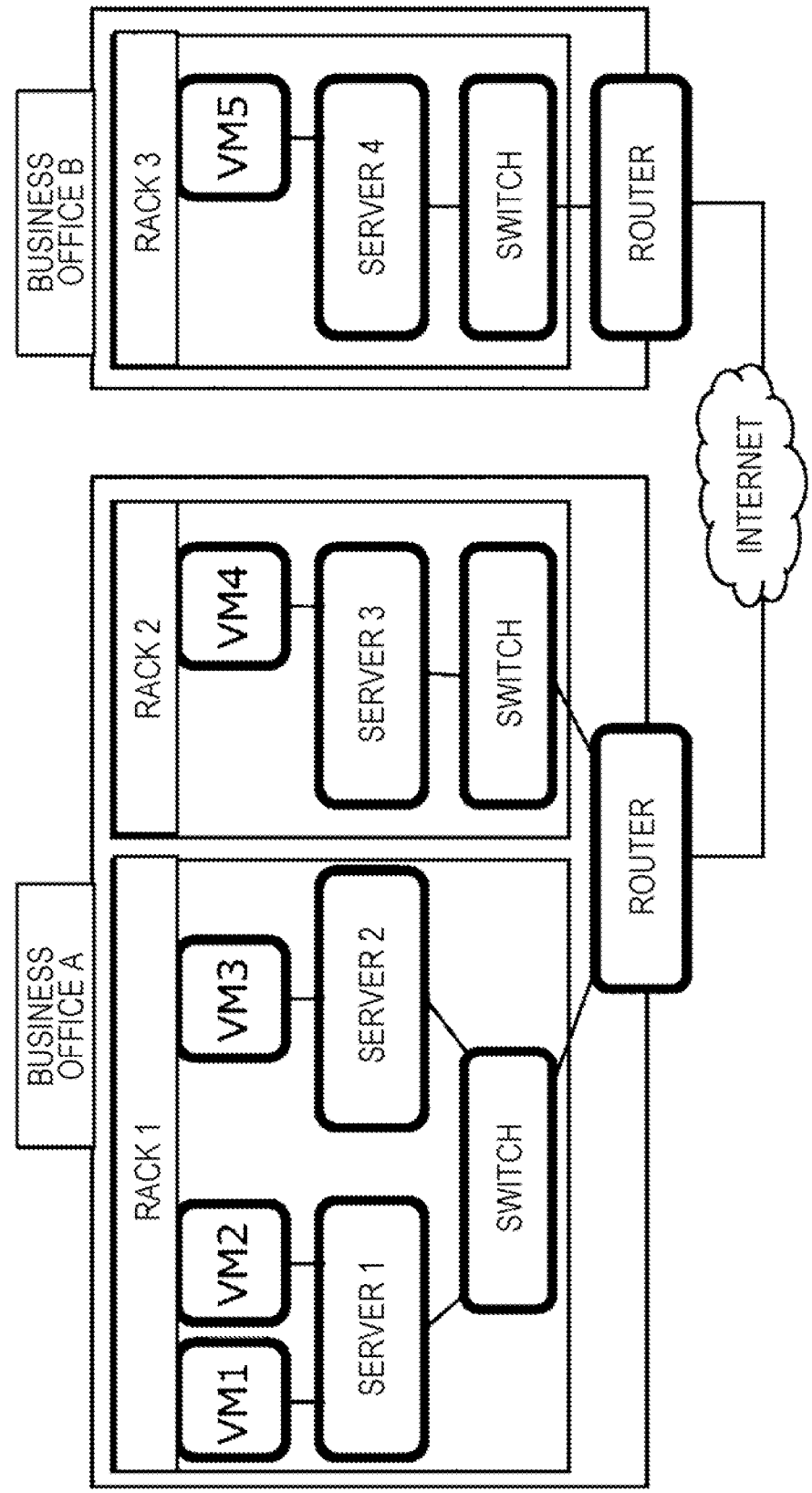
FIG. 7 is a diagram illustrating an example of an arrangement configuration of virtual machines in a business system.

The business system 10 is a business system constructed over a cloud environment. FIG. 7 is a diagram illustrating an example of an arrangement configuration of virtual machines in the business system 10. As illustrated in FIG. 7, the business system 10 is divided into a plurality of business offices, for example, here, a business office A and a business office B to be arranged, and respective servers in the business offices are coupled to the Internet via switches and routers. The servers are managed in units of racks, and virtual machines are appropriately arranged on the servers in the racks. The entire network of the business system 10 is managed by the managing server 14. A configuration change of a network such as a migration of a virtual machine is controlled by the managing server 14. The business system 10 performs a configuration change such as a migration of a virtual machine in accordance with a configuration change notification received from the managing server 14. The processing related to the configuration change is not the main processing of the technology of the present disclosure, and therefore description thereof will be omitted. Although only one business system 10 is illustrated in FIG. 6 for convenience of explanation, when the method according to the present embodiment is used, even when there are a plurality of business systems, each of them may be treated as an individual business system 10, and thereby the business systems may be treated in the same manner.

The business system 10 is managed by a business system operator, and the business system operator checks a communication status or the like of the business system 10 and makes an inquiry or the like to an infrastructure operator when a failure such as a communication delay occurs. Upon receiving the inquiry, the infrastructure operator may check a difference graph generated by the managing server 14 and determine which configuration change is the cause of the occurring failure. Since this type of inquiry is an optional artificial procedure and is not processing required for the present disclosure, detailed description thereof will be omitted.

The information terminal 12 is a terminal operated by an infrastructure operator. The infrastructure operator operates the information terminal 12 to access the managing server 14, and performs work such as a configuration change of a network of the business system 10 as required. The information terminal 12 displays a difference graph generated for each configuration change by a predetermined operation, and presents the difference graph to the infrastructure operator. The information terminal 12 may be achieved by, for example, a personal computer, a tablet terminal, a smartphone, or the like.

The managing server 14 includes a communication unit 60, a configuration managing unit 62, a cost matrix calculation unit 64, an arrangement information creation unit 66, a model creation unit 68, a difference extraction unit 70, a display information generation unit 72, a configuration storage unit 78, and a communication cost model storage unit 80. Since a specific form of processing by the managing server 14 will be described later in the description of the operation, each processing unit of the managing server 14 will be simply described in the following description of the configuration.

The configuration storage unit 78 stores, as a history of the configuration information of the network of the business system 10, communication relationships between the virtual machines and arrangement locations of the virtual machines. The configuration storage unit 78 stores communication cost definition information. FIG. 8 is a diagram illustrating an example of a communication relationship between virtual machines. As illustrated in FIG. 8, for the communication relationship between the virtual machines, a communication history including a date and time, a transmission source (src in FIG. 8), and a destination (dst in FIG. 8) is used. In order to acquire the latest communication relationship, a communication history at the latest date and time among communication histories of combinations of the transmission sources and the destinations may be referred to. FIG. 9 is a diagram illustrating an example of the arrangement locations of the virtual machines. As illustrated in FIG. 9, information on a business office, a rack, and a server where the virtual machine is arranged is recorded for each virtual machine. FIG. 10 is a diagram illustrating an example of the communication cost definition information. In the example of FIG. 10, the communication cost in the same server is defined as 0, the communication cost in the same rack is defined as 1, the communication cost in the same business office is defined as 10, and the communication cost in different business offices is defined as 100. In the example of FIG. 10, the larger the number of the communication cost, the longer the communication distance between the virtual machines, for example, the longer the communication time. As described above, in the communication cost definition information, the communication cost is defined for each positional relationship between the virtual machines in the network configuration. The communication cost is merely an example, and may be another value such as a physical distance, the number of hops, and a communication time corresponding to the positional relationship between the two virtual machines.

The communication cost model storage unit 80 stores the communication cost model created by the model creation unit 68. The difference between the communication costs calculated by the difference extraction unit 70 and the difference graph generated by the display information generation unit 72 are stored.

The communication unit 60 receives various operations from the information terminal 12. The communication unit 60 transmits the configuration change notification to the business system 10. The communication unit 60 transmits the difference graph generated by the display information generation unit 72 to the information terminal 12.

The configuration managing unit 62 performs a configuration change or the like of the business system 10 in accordance with various operations received from the information terminal 12 and updates the configuration information of the configuration storage unit 78. The configuration managing unit 62 determines whether or not a configuration change is performed in the difference graph generation processing.

The cost matrix calculation unit 64 calculates a communication cost matrix based on the communication relationship between the virtual machines.

The arrangement information creation unit 66 creates a communication distance relationship between the virtual machines based on the arrangement locations of the virtual machines and the communication cost matrix calculated by the cost matrix calculation unit 64.

The model creation unit 68 creates a communication cost model for each configuration change.

The difference extraction unit 70 extracts a difference between communication cost models before and after the configuration change with reference to the communication cost models before and after the configuration change.

The display information generation unit 72 generates a difference graph in which the difference extracted by the difference extraction unit 70 is associated.

Figure 11:
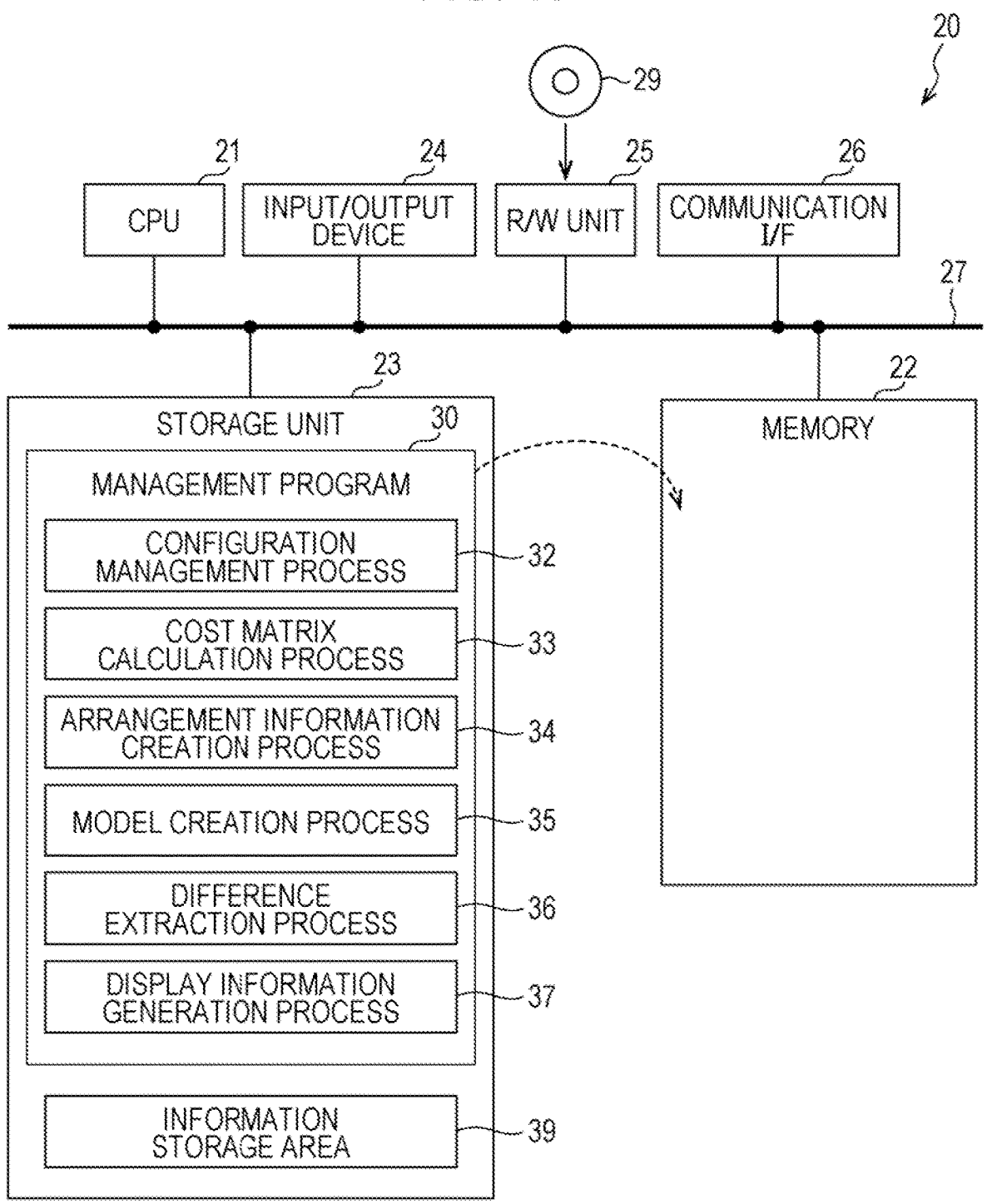
FIG. 11 is a block diagram illustrating a schematic configuration of a computer functioning as a managing server.

The managing server 14 may be achieved by, for example, a computer 20 illustrated in FIG. 11. The computer 20 includes a central processing unit (CPU) 21, a memory 22 serving as a temporary storage area, and a storage unit 23 that is nonvolatile. The computer 20 also includes an input/output device 24, a read/write (R/W) unit 25 for controlling reading and writing of data to and from a storage medium 29, and a communication interface (I/F) 26 coupled to a network such as the Internet. The CPU 21, the memory 22, the storage unit 23, the input/output device 24, the R/W unit 25, and the communication I/F 26 are coupled to each other via a bus 27.

The storage unit 23 may be achieved by a hard disk drive (HDD), a solid-state drive (SSD), a flash memory, or the like. The storage unit 23 as a storage medium stores a management program 30 for causing the computer 20 to function as the managing server 14. The management program 30 has a configuration management process 32, a cost matrix calculation process 33, an arrangement information creation process 34, a model creation process 35, a difference extraction process 36, and a display information generation process 37. The storage unit 23 has an information storage area 39 in which information configuring each of restriction information DB 80 and sequence data DB 82 is stored. The management program 30 is an example of an information processing program.

The CPU 21 reads the management program 30 from the storage unit 23, loads the read management program 30 into the memory 22, and sequentially executes the processes included in the management program 30. The CPU 21 operates as the configuration managing unit 62 illustrated in FIG. 6 when the configuration management process 32 is executed. The CPU 21 operates as the cost matrix calculation unit 64 illustrated in FIG. 6 when the cost matrix calculation process 33 is executed. The CPU 21 operates as the arrangement information creation unit 66 illustrated in FIG. 6 when the arrangement information creation process 34 is executed. The CPU 21 operates as the model creation unit 68 illustrated in FIG. 6 when the model creation process 35 is executed. The CPU 21 operates as the difference extraction unit 70 illustrated in FIG. 6 when the difference extraction process 36 is executed. The CPU 21 operates as the display information generation unit 72 illustrated in FIG. 6 when the display information generation process 37 is executed. The CPU 21 reads information from the information storage area 39 and loads the information in the configuration storage unit 78 and the communication cost model storage unit 80 into the memory 22. Thus, the computer 20 that executes the management program 30 functions as the managing server 14. The CPU 21 that executes the program is hardware.

The functions achieved by the management program 30 are also able to be achieved by, for example, a semiconductor integrated circuit, more specifically, an application-specific integrated circuit (ASIC) or the like.

Next, operations of the managing server 14 in the configuration management system 1 according to the present embodiment will be described. The difference graph generation processing of the managing server 14 will be described with reference to flowcharts of FIGS. 12 to 15. The difference graph generation processing includes model creation processing, difference extraction processing, and display generation processing. The configuration change of the following processing is a configuration change for the business system 10. The difference graph generation processing is an example of the information processing method of the disclosed technique.

Figure 12:
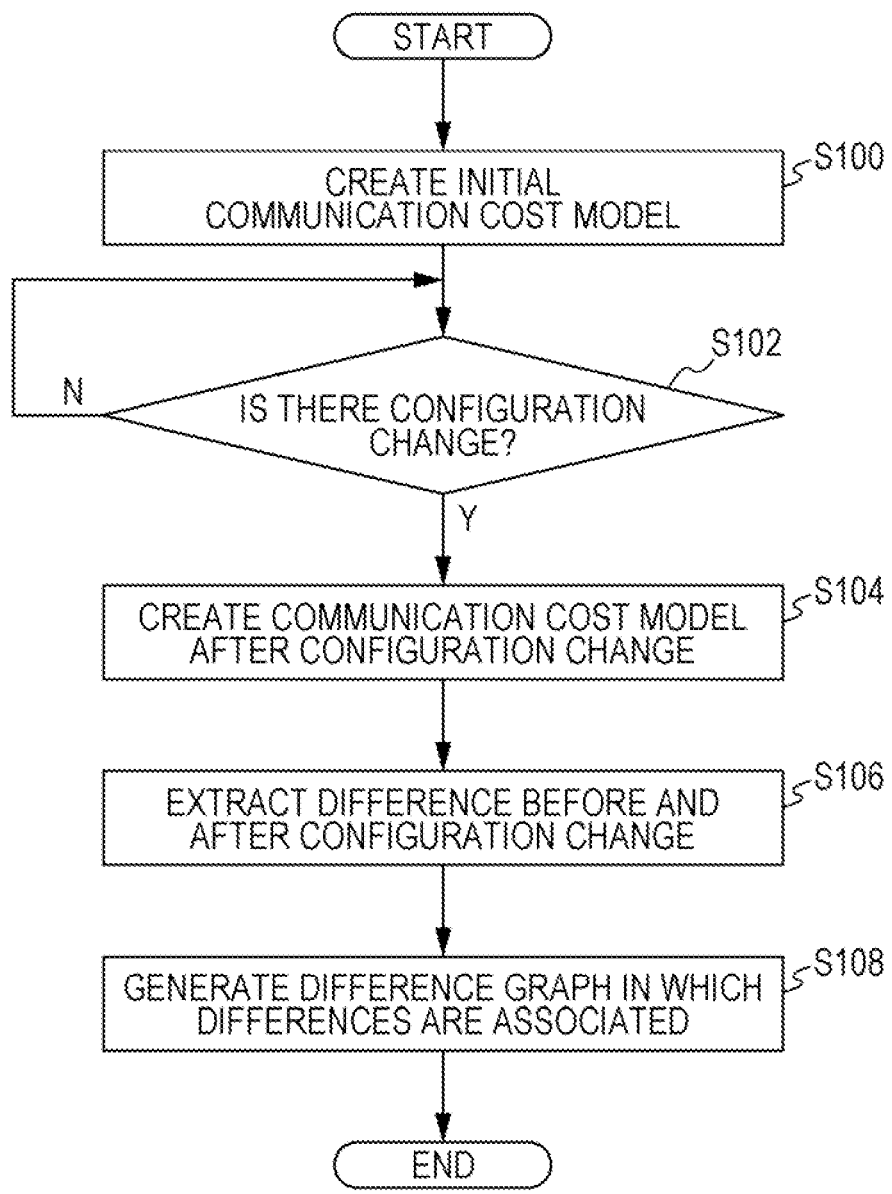
FIG. 12 is a flowchart illustrating an example of difference graph generation processing.

First, the difference graph generation processing indicating a flow of an entire processing will be described. FIG. 12 is a flowchart illustrating an example of the difference graph generation processing.

In step S100, the model creation unit 68 creates an initial communication cost model. To create the communication cost model, each communication relationship between the virtual machines and an arrangement location of each of the virtual machines are used. Details of the model creation processing in step S100 will be described later.

In step S102, the configuration managing unit 62 determines whether or not a configuration change is performed. In a case where the configuration change is performed, the process proceeds to step S104, and in a case where the configuration change is not performed, the processing in step S102 is repeated. Whether or not a configuration change is performed may be determined based on a change history (not illustrated) managed by the configuration managing unit 62.

In step S104, the model creation unit 68 creates a communication cost model after the configuration change. The model creation processing in step S104 is the same as that in step S100.

In step S106, the difference extraction unit 70 refers to the communication cost models before and after the configuration change in the communication cost model storage unit 80, and extracts a difference between the communication distance relationships before and after the configuration change. Details of the difference extraction processing in step S106 will be described later.

In step S108, the display information generation unit 72 generates a difference graph in which the difference extracted in step S106 is associated. The difference graph is represented by a graph including nodes and edges included in both of the configurations before and after the configuration change, and is represented by associating the extracted difference with the edge. After step S108, the processing returns to step S102 to repeat the processing. Details of the display generation processing in step S108 will be described later.

Figure 13:
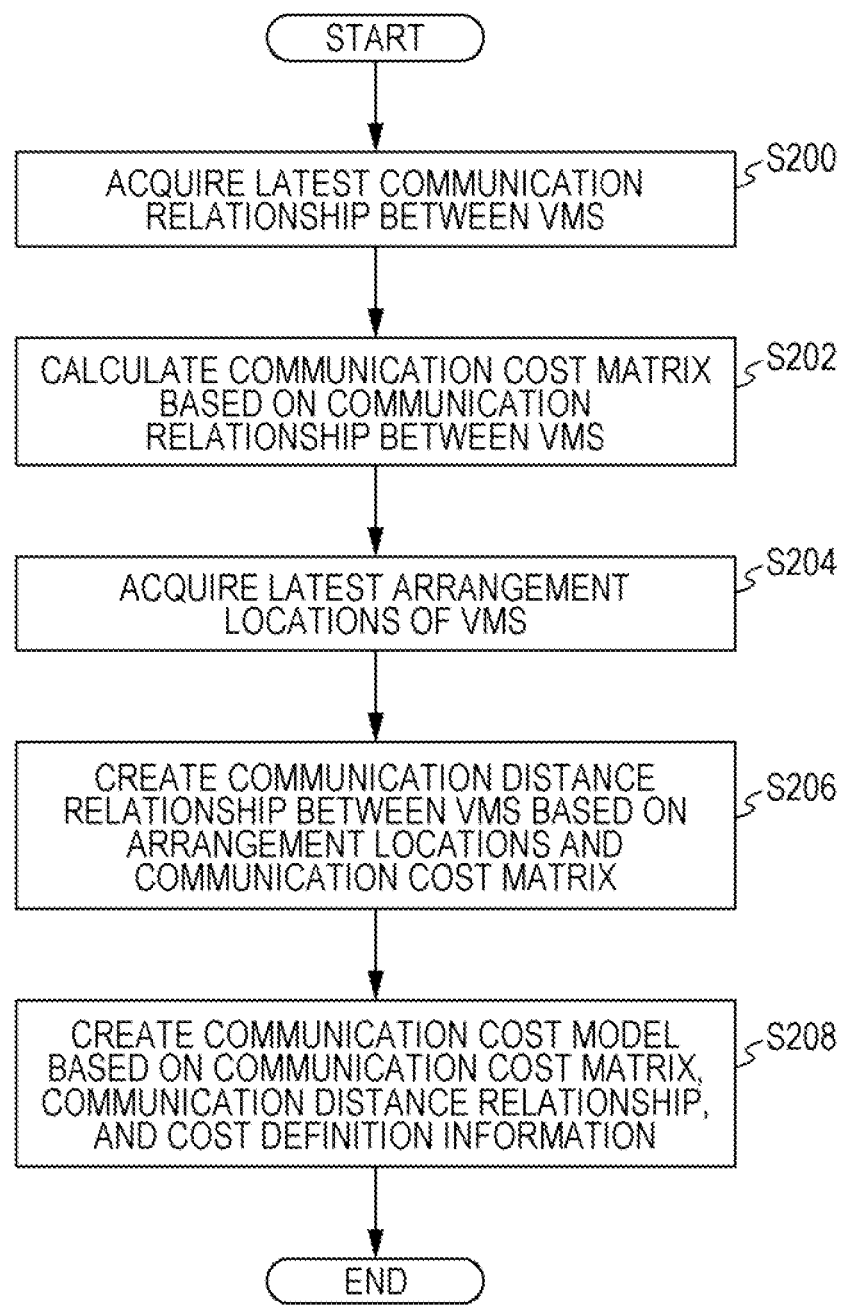
FIG. 13 is a flowchart illustrating an example of model creation processing.

Next, the model creation processing in steps S100 and S104 is described. FIG. 13 is a flowchart illustrating an example of the model creation processing.

In step S200, the cost matrix calculation unit 64 acquires the latest communication relationships between the virtual machines from the configuration storage unit 78.

In step S202, the cost matrix calculation unit 64 calculates a communication cost matrix based on the communication relationships between the virtual machines. FIG. 16 is a diagram illustrating an example of the communication cost matrix. As illustrated in FIG. 16, the communication cost matrix is represented as a symmetric matrix of combinations between virtual machines. In the communication cost matrix, 0 is displayed as an initial value in a cell between virtual machines having a communication relationship, and a hyphen indicating that there is no communication relationship is displayed in a cell between virtual machines having no communication relationship.

In step S204, the arrangement information creation unit 66 acquires the latest arrangement locations of the virtual machines from the configuration storage unit 78. The arrangement locations of the virtual machines acquired here are the latest data of the arrangement locations of the virtual machines stored in the configuration storage unit 78.

In step S206, the arrangement information creation unit 66 creates a communication distance relationship between the virtual machines based on the arrangement locations of the virtual machines stored in the configuration storage unit 78 and the communication cost matrix calculated in step S202. The communication distance relationship between the virtual machines is created with reference to the arrangement locations of the virtual machines. For example, with reference to the arrangement locations in FIG. 9, since the VM1 and the VM2 are both the business office A, the rack 1, and the server 1, a communication distance relationship of "in the same server" is created. FIG. 17 is a diagram illustrating an example of the created communication distance relationship. As illustrated in FIG. 17, the communication distance relationship between the virtual machines is stored in the corresponding cell of the communication cost matrix.

In step S208, the model creation unit 68 creates a communication cost model based on the communication cost matrix calculated in step S202, the communication distance relationship created in step S206, and cost definition information. The communication cost model in FIG. 4 is created by storing the communication cost of the cost definition information corresponding to the row and the column, in the value of the communication cost matrix with reference to the communication distance relationship. Since the positional relationship of the cost definition information corresponds to the communication distance relationship, it is sufficient to allocate and store the communication cost of the positional relationship of the cost definition information corresponding to the communication distance relationship. For example, since the communication distance relationship between the VM2 and the VM5 is "different business offices", 100 that is the communication cost of the "different business offices" of the cost definition information is allocated.

Figure 14:
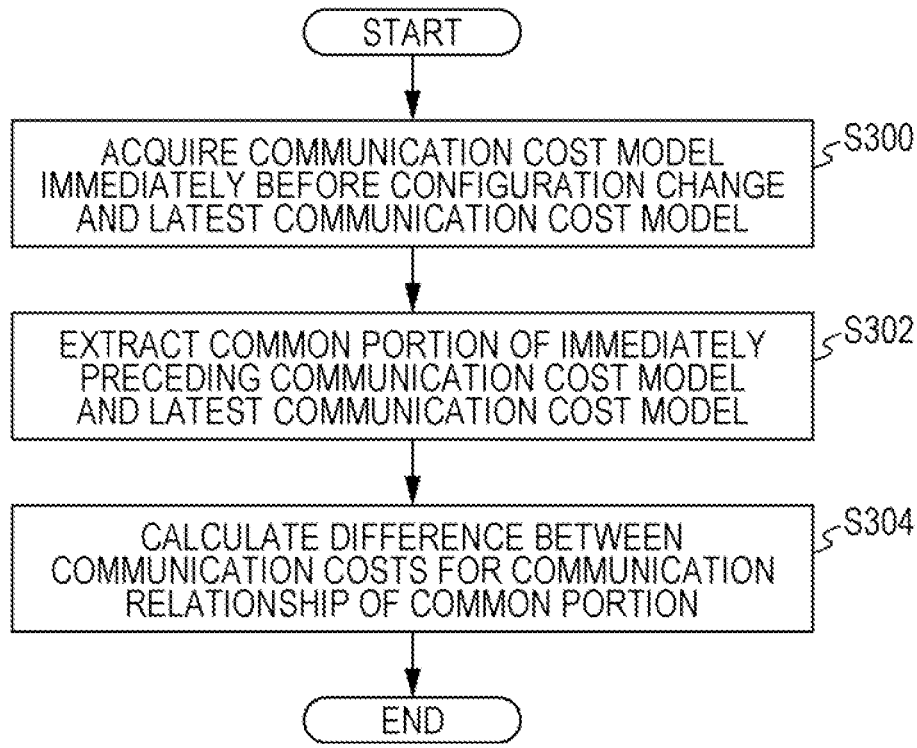
FIG. 14 is a flowchart illustrating an example of difference extraction processing.

Next, the difference extraction processing in step S106 will be described. FIG. 14 is a flowchart illustrating an example of the difference extraction processing.

In step S300, the difference extraction unit 70 acquires a communication cost model immediately before the configuration change and the latest communication cost model from the communication cost model storage unit 80. The immediately preceding communication cost model is an example of a first model of the disclosed technique, and the latest communication cost model is an example of a second model of the disclosed technique.

In step S302, the difference extraction unit 70 extracts a common portion between the immediately preceding communication cost model and the latest communication cost model. The common portion is a virtual machine that exists in any communication cost model. By extracting the common portion, the difference graph may be represented by a graph including nodes and edges included in both of the configurations before and after the configuration change.

In step S304, the difference extraction unit 70 calculates a difference between the communication costs for the communication relationship of the common portion extracted in step S302. The calculated difference between the communication costs is stored in the communication cost model storage unit 80. FIG. 18 is a diagram illustrating an example of the communication cost model reflecting the calculation result of the difference between the communication costs. In the example of the communication cost model in FIG. 18, the difference of the communication costs between the VM1 and the VM2 is "+10", which indicates that it is increased, and the difference of the communication costs between the VM2 and the VM4 is "−10", which indicates that it is decreased.

Figure 15:
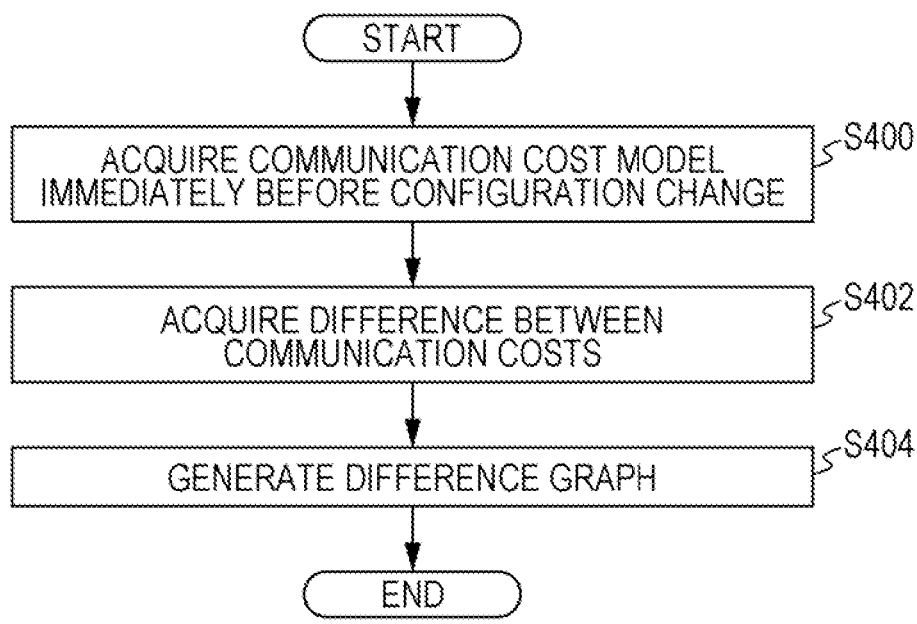
FIG. 15 is a flowchart illustrating an example of display generation processing.

Next, the display generation processing in step S108 will be described. FIG. 15 is a flowchart illustrating an example of the display generation processing.

In step S400, the display information generation unit 72 acquires a communication cost model immediately before the configuration change.

In step S402, the display information generation unit 72 acquires a difference between the communication costs calculated in step S304.

Figure 19:
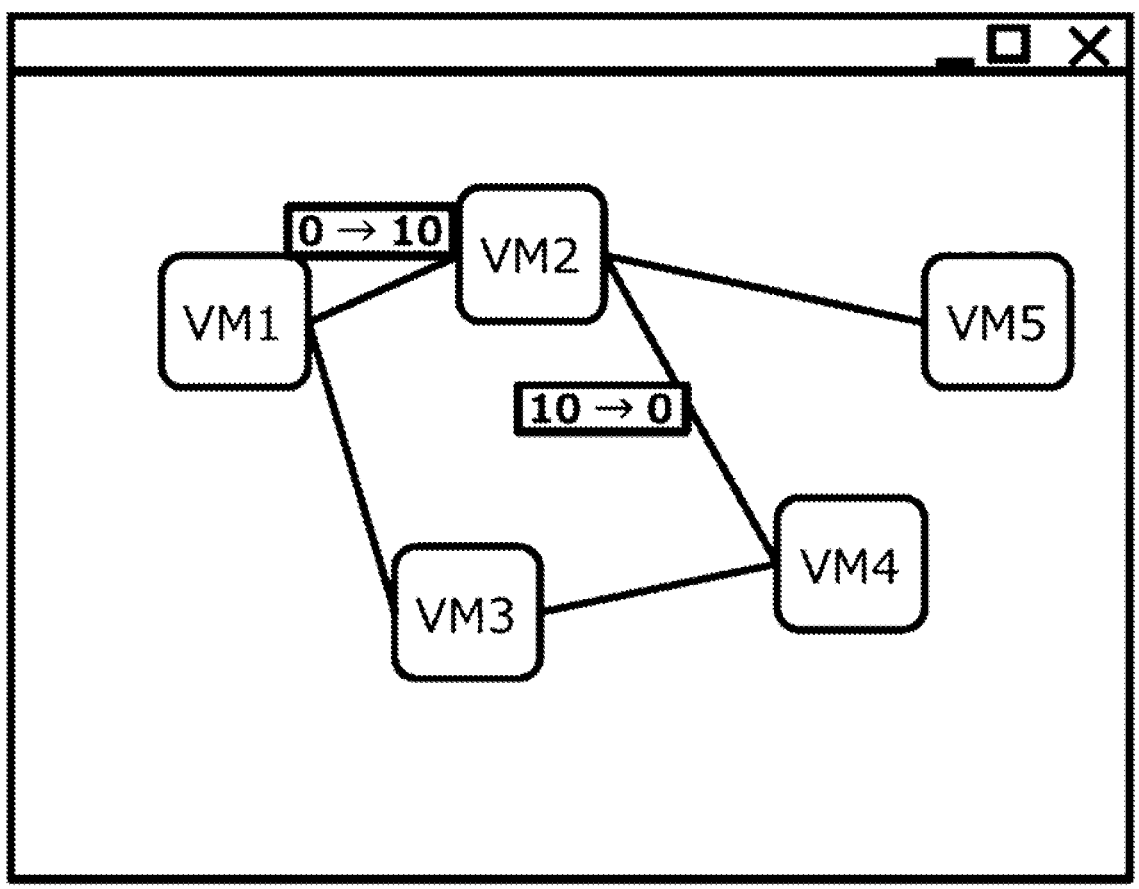
FIG. 19 is a diagram illustrating an example of a case where a difference graph is displayed on an information terminal.

In step S404, the display information generation unit 72 generates a difference graph based on the immediately preceding communication cost model and the difference between the communication costs calculated in the difference extraction processing. The difference graph is stored in the communication cost model storage unit 80 for each version of the configuration change. The difference graph may be read from the information terminal 12 at an optional timing and displayed. FIG. 19 is a diagram illustrating an example of a case where the difference graph is displayed on the information terminal 12. In the example of the difference graph illustrated in FIG. 19, the difference described with reference to FIG. 18 is represented so that the difference is associated with the edge. For example, in a case where the communication cost between the VM1 and the VM2 in the immediately preceding communication cost model is "0" and the calculated difference between the communication costs is "10", at the edge between the VM1 and the VM2, "0→10" is represented to indicate the variation of the communication cost. In the expression "0→10", "0" represents the immediately preceding communication cost, and "10" represents the latest communication cost. The latest communication cost is calculated from the immediately preceding communication cost and the calculated difference. Representing the variation of the communication cost in the difference graph is an example of representing the difference in association with the edge, which is the disclosed technique. As described above, in the processing in this step, the difference graph is generated so as to represent the variation of the communication cost due to the configuration change from the immediately preceding communication cost to the latest communication cost. With such expression of the difference graph, the infrastructure operator may easily check how much variation has occurred between which virtual machines. The difference value may be added to the variation of the communication cost.

As described above, with the configuration management system according to the present embodiment, the influence of the configuration change may be easily grasped.

In the above-described embodiment, regarding the communication cost definition information, a case of defining the communication cost by focusing on which area the virtual machine exists in, such as the same rack and the same business office has been described, but the present disclosure is not limited to this. For example, the communication cost may be defined in consideration of not only the area but also the number of devices passing through, for example, the number of routers.

In the embodiment described above, a case where the configuration change of the business system 10 is performed by the managing server 14 has been described. However, the present disclosure is not limited thereto. For example, the configuration change of the business system 10 may be performed by an external server, and the managing server 14 may receive a notification of the configuration change from the external server and perform the difference graph generation processing.

In the above-described embodiment, a case where the immediately preceding or the latest communication cost model is used has been described as an example, but the present disclosure is not limited thereto. For example, instead of the immediately preceding communication cost model, a communication cost model having a history of an optional configuration change may be used as the first model of the present disclosure. The configuration after the change does not have to be the latest, and a communication cost model having a history of an optional configuration change after the configuration of the second model may be used as the second model. In this case, the processing of extracting the difference and visualizing the difference is performed by comparing the first model for the configuration before the predetermined configuration change with the second model for the configuration after the predetermined configuration change. Thus, the configuration change other than the latest configuration change may be retroactively visualized. It is possible to visualize not only a case where the configurations before and after the configuration change are continuous but also a case where the configuration change is performed at intervals.

In the above-described embodiment, a case where processing to create a communication cost model, extract the difference, and generate a difference graph each time a configuration change is performed has been described as an example, but the present disclosure is not limited to this. For example, the configuration changes for predetermined units may be collectively processed to generate a difference graph for each configuration change. The configuration changes performed at regular time intervals may be collectively processed to generate a difference graph for each configuration change.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A network configuration diagram generate method executed by a computer, the method comprising:
    identifying, in a predetermined system in which a plurality of virtual machines are used, a location where each of the plurality of virtual machines is located and a communication destination with which each of the plurality of virtual machines communicates;
    determining, for each change in a configuration of the predetermined system, each communication distance between virtual machines that have communication among the plurality of virtual machines by using the location and the communication destination, the configuration indicating whether communication between each of the plurality of virtual machines is present;
    generating a first matrix that indicates each communication distance between the plurality of virtual machines corresponding to a row and a column as a symmetric matrix;
    generating a second matrix that indicates each communication distance after change in the configuration when the location is changed; and
    generating a network configuration diagram in which a difference between the first matrix and the second matrix is indicated.

2. The network configuration diagram generate method according to claim 1, wherein
    the network configuration diagram is indicated by a graph representing the plurality of virtual machines as nodes and communication relationships between the plurality of virtual machines as edges, and
    the generating process includes:
        associating the extracted difference with the edges, and
        visualizing the associated edges in the network configuration diagram.

3. The network configuration diagram generate method according to claim 1, wherein
    the network configuration diagram indicates difference by representing addition or subtraction of amount of difference between the first matrix and the second matrix.

4. The non-transitory computer-readable storage medium according to claim 1, wherein
    the network configuration diagram indicates difference by representing addition or subtraction of amount of difference between the first matrix and the second matrix.

5. A non-transitory computer-readable storage medium storing a program that causes a computer to execute a process, the process comprising:
    identifying, in a predetermined system in which a plurality of virtual machines are used, a location where each of the plurality of virtual machines is located and a communication destination with which each of the plurality of virtual machines communicates;
    determining, for each change in a configuration of the predetermined system, each communication distance between virtual machines that have communication among the plurality of virtual machines by using the location and the communication destination, the configuration indicating-a whether communication between each of the plurality of virtual machines is present;
    generating a first matrix that indicates each communication distance between the plurality of virtual machines corresponding to a row and a column as a symmetric matrix;
    generating a second matrix that indicates each communication distance after change in the configuration when the location is changed; and
    generating a network configuration diagram in which the extracted a difference between the first matrix and the second matrix is indicated.

6. The non-transitory computer-readable storage medium according to claim 5, wherein
    the network configuration diagram is indicated by a graph representing the plurality of virtual machines as nodes and communication relationships between the plurality of virtual machines as edges, and
    the generating process includes:
        associating the extracted difference with the edges, and
        visualizing the associated edges in the network configuration diagram.

* * * * *